INVENTOR
EMERY I. VALYI
BY
ATTORNEY 3,062,403
PRESSURE VESSEL AND METHOD OF MAKING
SAME
Emery I. Valyi, New York, N.Y.
(% Ard Corp., 20 S. Broadway, Yonkers 1, N.Y.)
Original application Mar. 12, 1957, Ser. No. 645,592. Divided and this application Feb. 25, 1960, Ser. No. 10,982
1 Claim. (Cl. 229—72)

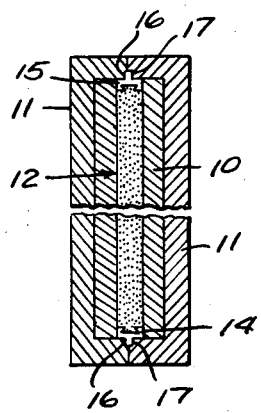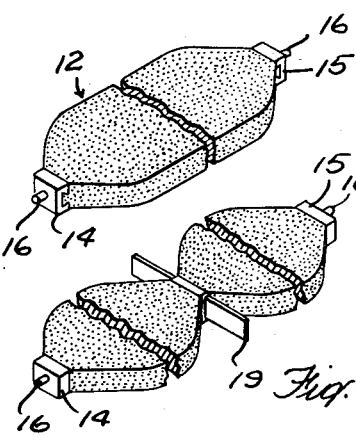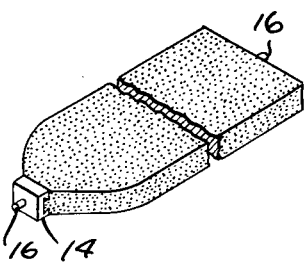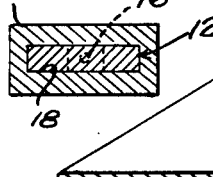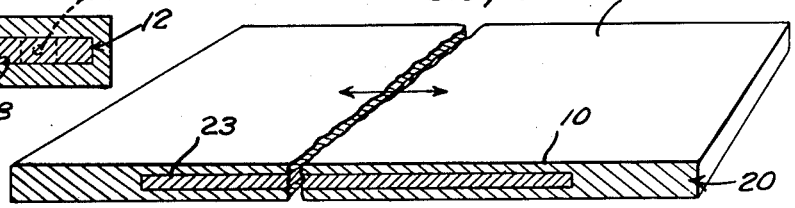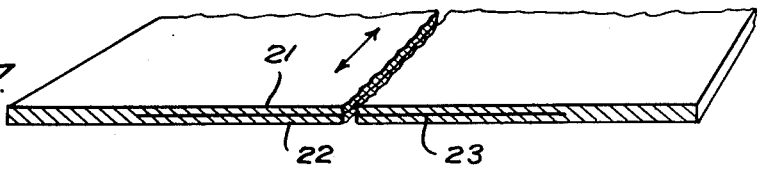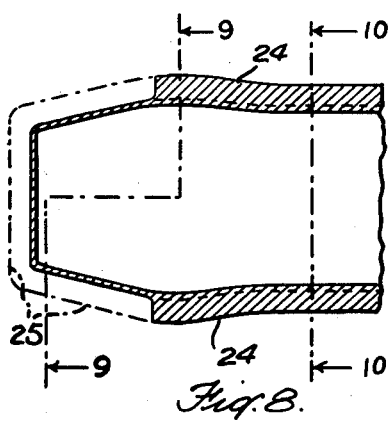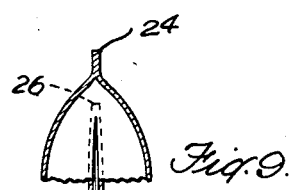
INVENTOR.
EMERY I. VALYI Nov. 6, 1962 E. I. VALYI 3,062,403
PRESSURE VESSEL AND METHOD OF MAKING SAME
Original Filed March 12, 1957 2 Sheets-Sheet 2

This invention relates to seamless vessels and has for an object to provide a novel and improved product of that type.

This application is a division of my co-pending application Serial No. 645,592 filed March 12, 1957, now Patent No. 2,957,234.

An object of this invention is to provide a novel and improved vessel wherein welding and annealing the vessel is eliminated or at least substantially reduced.

Another object is to provide closed end vessels having integral external fins or ribs.

Various other objects and advantages will be apparent as the nature of the invention is more fully disclosed.

Closed vessels, such as containers used for the transporting of liquids and gases, or as containers in the chemical industry, or as pressure vessels, are usually fabricated by extensive use of welding. This entails the use of highly skilled labor and extensive and complete inspection of all weld areas. In addition in many desirable alloys the characteristic of the parent metal is altered irreversibly in the entire heat affected area which results in undesirable physical properties.

To produce the vessel of this invention, a casting containing a refractory core is first made, shaped to produce a chamber in the casting. The refractory core may be provided with one or more metal supports which position the core accurately in the mold and which are adapted to fuse into the metal of the casting in the casting step, or which are adapted to become integral with the metal of the casting during the subsequent rolling thereby constituting closures or partial closures for the core chamber in the casting.

After the casting is removed from the mold in which it was made it is rolled in one or more directions to form a flat sheet in which the core chamber is flattened to the form of a thin slit having a size and shape suited when inflated to produce the desired vessel. The initial stages of the rolling may be made with the casting hot and the final stages may take place with the sheet cold so as to impart the desired metallurgical characteristic to the rolled sheet. Welding of the opposite walls of the core chamber is prevented during rolling, as for example by allowing the refractory core to disintegrate and to form a coating.

If the flattened chamber is closed at both ends a hole is drilled into the flattened chamber and fluid pressure is introduced to expand the walls to the shape of the desired vessel. The portion of the sheet beyond the flattened chamber forms fins or ribs extending along opposite side walls of the vessel and around or partly around the closed end or ends. These fins or ribs may serve as reinforcing elements or as supports or attaching means for other equipment. The fins or ribs may be removed or partly removed where not required on the finished vessel and they are reduced by partial removal to a bead at the closed ends.

If in producing the casting the refractory core extends to a point beyond the mold cavity, the vessel will be closed at one end only and will be open at the other end. In this case expanding the flattened chamber after the rolling operation can be done by hydraulic or mechanical means, or a combination of both.

The characteristics of the vessel and the steps in forming the vessel will be better understood from the following description, taken in connection with the accompanying drawings in which a specific embodiment has been set forth for purpose of illustration.

In the drawings:

FIG. 1 is a transverse section through a mold showing a casting and cores therein embodying the present invention;

FIG. 2 is a detail view of the core used in the mold of FIG. 1;

FIG. 3 is a detail view of a similar core having a metal tip at one end only;

FIG. 4 is a detail view of a similar core having an intermediate metal support;

FIG. 5 is a transverse section through the casting of FIG. 1;

FIG. 6 is a broken perspective view of the casting after rolling in one direction;

FIG. 7 is a similar broken perspective view of the casting after rolling in two directions to form a flat sheet;

FIG. 8 is a longitudinal section of a vessel made from the rolled sheet of FIG. 7;

Figure 10:
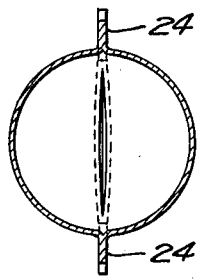
Figure 11:
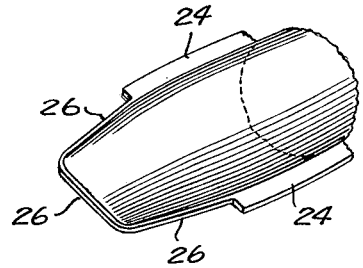
Figure 12:
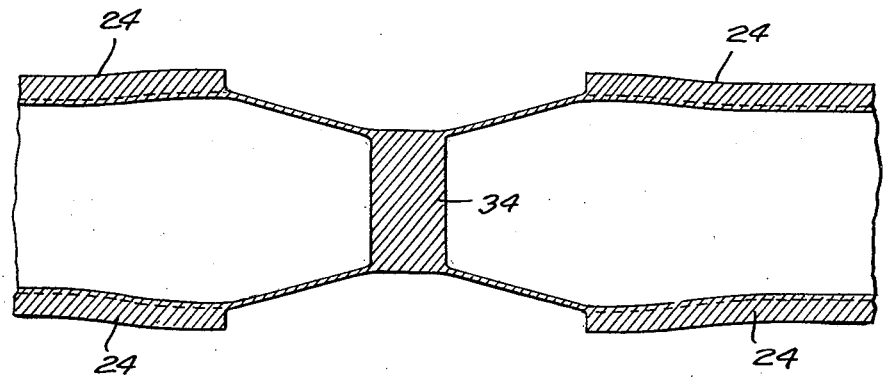

FIGS. 9 and 10 are transverse sections through the vessel taken on the lines 9—9 and 10—10 respectively of FIG. 8;

FIG. 11 is a perspective view of a vessel made from the rolled sheet of FIG. 7; and FIG. 12 is a partial longitudinal section showing a pair of axially aligned vessels as produced by the use of a core shaped as that of FIG. 4.

Referring to the drawings more in detail, FIG. 1 shows a casting 10 cast in a mold 11 around a refractory core 12 having metal tips 14 and 15. The metal tips 14 and 15 are formed with projections 16 which seat in recesses 17 in the mold to hold the cores in place during the pouring operation. The metal tips 14 and 15 fuse into the poured metal or become integral with the metal of the casting during the subsequent rolling operation to form in the casting a closed core chamber 18.

A core of the above type is shown in FIG. 2. FIG. 3 shows a similar core with the metal tip at one end only. If this core is used instead of the core of FIG. 2 the casting will have a core chamber 18 which is closed at one end and open at the other.

FIG. 4 shows a refractory core 12 similar to FIG. 2 having a central metal support 19. If the core of FIG. 4 is used the core chamber 18 will be divided axially into two separate parts and will have closed ends. If the metal tips 14 and 15 are not used, open end core chambers will be produced. The type, size and shape of the core is selected to produce a vessel of the desired configuration.

The casting 10 after removal from the mold is rolled transversely by known technique to form the sheet 20 of FIG. 6 with walls 21 and 22 separated by a slit 23 in the area of the now flattened core chamber. The core may be still in place as shown in FIG. 5 during rolling.

The sheet 20 is then rolled longitudinally to extend it to the size required for the vessel or vessels to be formed, as shown in FIG. 7. Of course the order of the longitudinal and transverse rolling may be reversed or alternated as desired to shape the final sheet to the required form. The transverse rolling may be omitted if not required.

According to the example shown here, the core 12 is crushed to powder and forms an anti-weld material to prevent the walls 21 and 22 from welding together. Other means to prevent such welding are known to those skilled in the art of rolling metal.

The sheet of FIG. 7 is now opened up to form the vessel of FIGS. 8 to 11. For this purpose a hole is drilled into the flattened chamber or slit 23 between the walls 21 and 22 and fluid pressure is introduced to force the plies apart and form them into the desired contour, for example into the contour of a closed vessel having side walls which may be subsentially cylindrical at at least their central portions, as shown in section in FIG. 10, and which taper or are flattened towards the ends, as shown in section in FIG. 9.

If one end of the slit 23 is open, as would be produced by the use of the core of FIG. 3, the walls may be expanded by fluid pressure or a tool may be introduced between the walls for expanding them into the form of an open end vessel, or a combination of hydraulic and mechanical means may be used.

The areas of the sheet beyond the flattened slit 23 produce longitudinal fins 24 which extend along the side walls of the vessel and form end fins 25 which are trimmed or partially removed before expanding the flattened chamber to leave beads 26 which extend across the closed end or ends of the vessel. Such removal of the end fins 25 limits the restraining effect which these fins would have upon the shaping of the walls of the vessel during expansion. The fins 25 should be trimmed to an extent such that the thickness of the bead 26 from the bottom of the slit in the rolled strip to the edge of the bead is of the order of the wall thickness of the vessel as indicated in FIGS. 8 to 11. If the bead 26 were made narrower than the walls, the walls would be weakened at this point. On the other hand, if the bead is made substantially thicker than the final wall thickness of the vessel, it would impart an undesirable resistance to the forming operation. The fins or ribs 24 may serve as structural reinforcing members and also provide means for attaching supports or auxiliary equipment without the necessity for welding onto the walls of the vessel.

A plurality of vessels may be made from a single casting by making a row of parallel core chambers in the casting. When rolled as above described and expanded a row of parallel vessels joined by intermediate webs are provided. The webs may be severed for separating the individual vessels if desired.

A longitudinally divided vessel may be made by forming a pair of vertically aligned core chambers in the casting. When this structure is rolled and expanded a closed vessel is formed having a longitudinal dividing wall separating the interior into two chambers.

When the core of FIG. 4 is used in making the casting a pair of axially aligned vessels is produced joined by webs 34 as in FIG. 12. The joining web 34 may be partially removed or notched to reduce the restraining influence thereof as in the case of the end fins 25 of FIG. 8. Of course more than two such axially aligned vessels may be made by introducing a plurality of intermediate metal members into the core.

These vessels may be severed through their joining webs 34 to form individual closed end vessels. Of course the closed end vessels may be severed transversely at any intermediate point to form a pair of vessels open at one end.

In any of the embodiments it is to be noted that the finally formed vessel is entirely integral and has the metallurgical characteristics produced by the rolling operations without local areas of differing characteristics such as would be produced by welding.

In the form shown in FIG. 8 the diameter of the vessel is shown as decreasing from the oval end section of FIG. 9 to the cylindrical central portion of FIG. 10. It is understood of course that this shape may be varied as desired by suitably shaping the core and that various intricate or irregular shapes of vessels may also be produced by correspondingly varying the contour of the core. The size and location of the openings may also be varied by suitable variations in the position and shape of the core. Such openings may be at the end or at the side, or a plurality of such openings may be formed in a single vessel as desired. The vessel may of course be made in various sizes, from those suitable for small pressure bottles to the dimensions of large boilers, autoclaves, or reactors.

What is claimed is:

An integral metal vessel having side walls and at least one end wall, a pair of fins extending longitudinally along opposite side walls and a bead having a minimum radial thickness of the order of the thickness of said walls extending around the end wall, said bead joining and forming a continuation of said fins, said walls, fins and bead being seamless and integral and all having the characteristics of rolled metal.

References Cited in the file of this patent

UNITED STATES PATENTS

| | | |
|---|---|---|
| 377,317 | Marshall | Jan. 31, 1888 |
| 2,690,002 | Grenell | Sept. 28, 1954 |
| 2,857,660 | Staples | Oct. 28, 1958 |
| 2,859,509 | Adams | Nov. 11, 1958 |

FOREIGN PATENTS

| | | |
|---|---|---|
| 4,794 | Great Britain | Feb. 17, 1894 |
| 190,585 | Great Britain | Dec. 28, 1922 |